Figure 1:
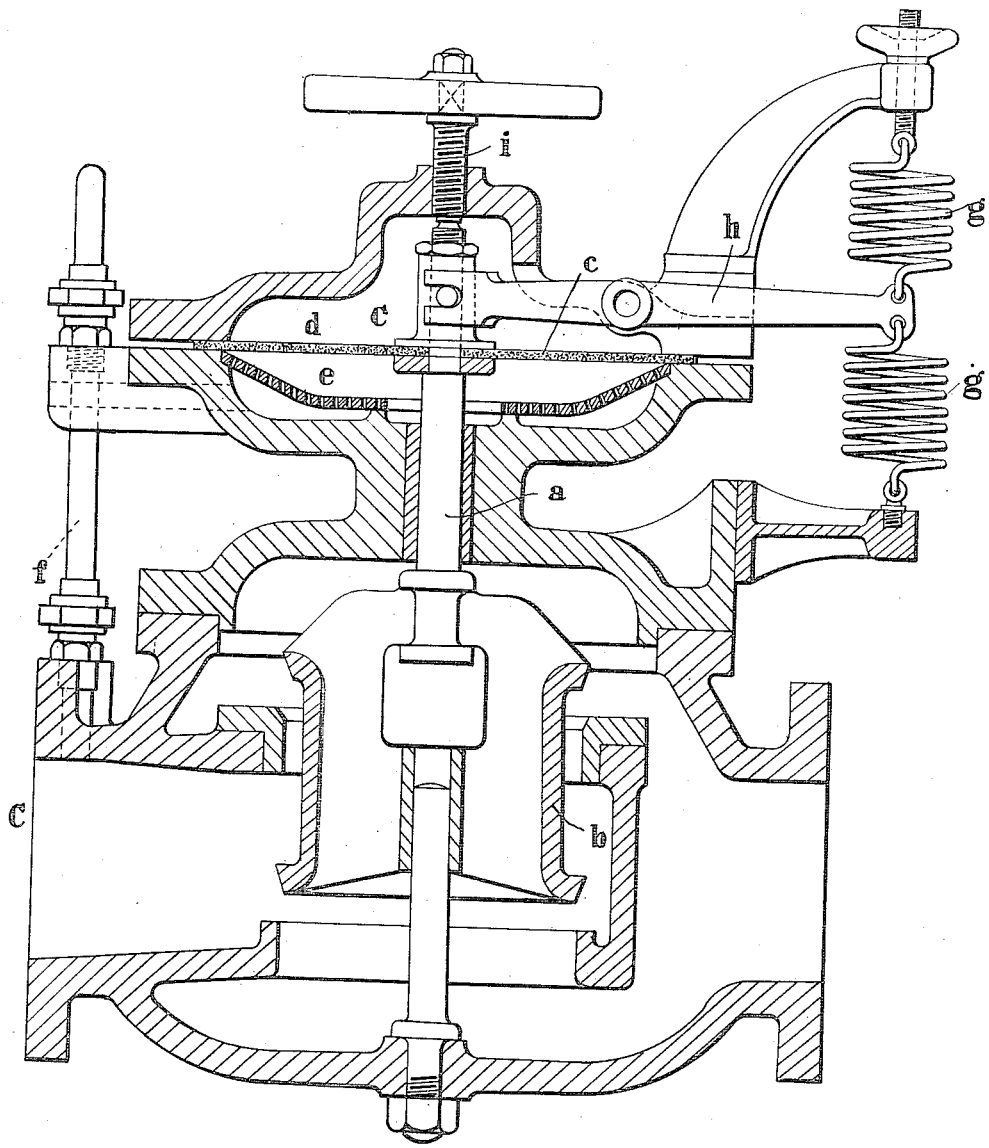

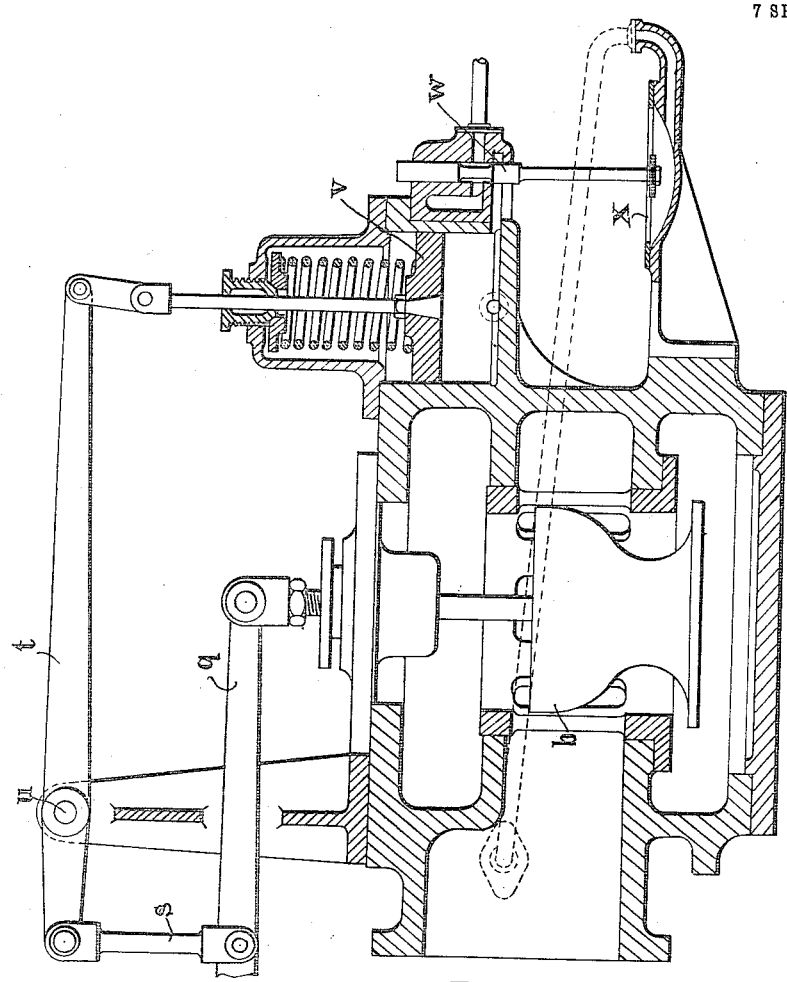
Fig. 4.
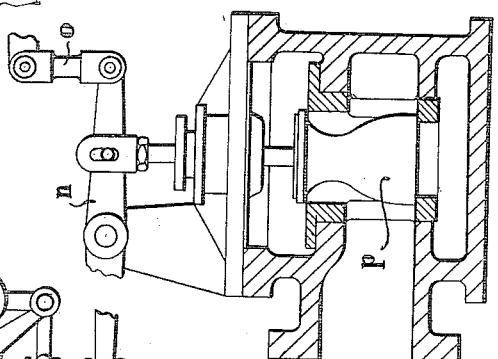

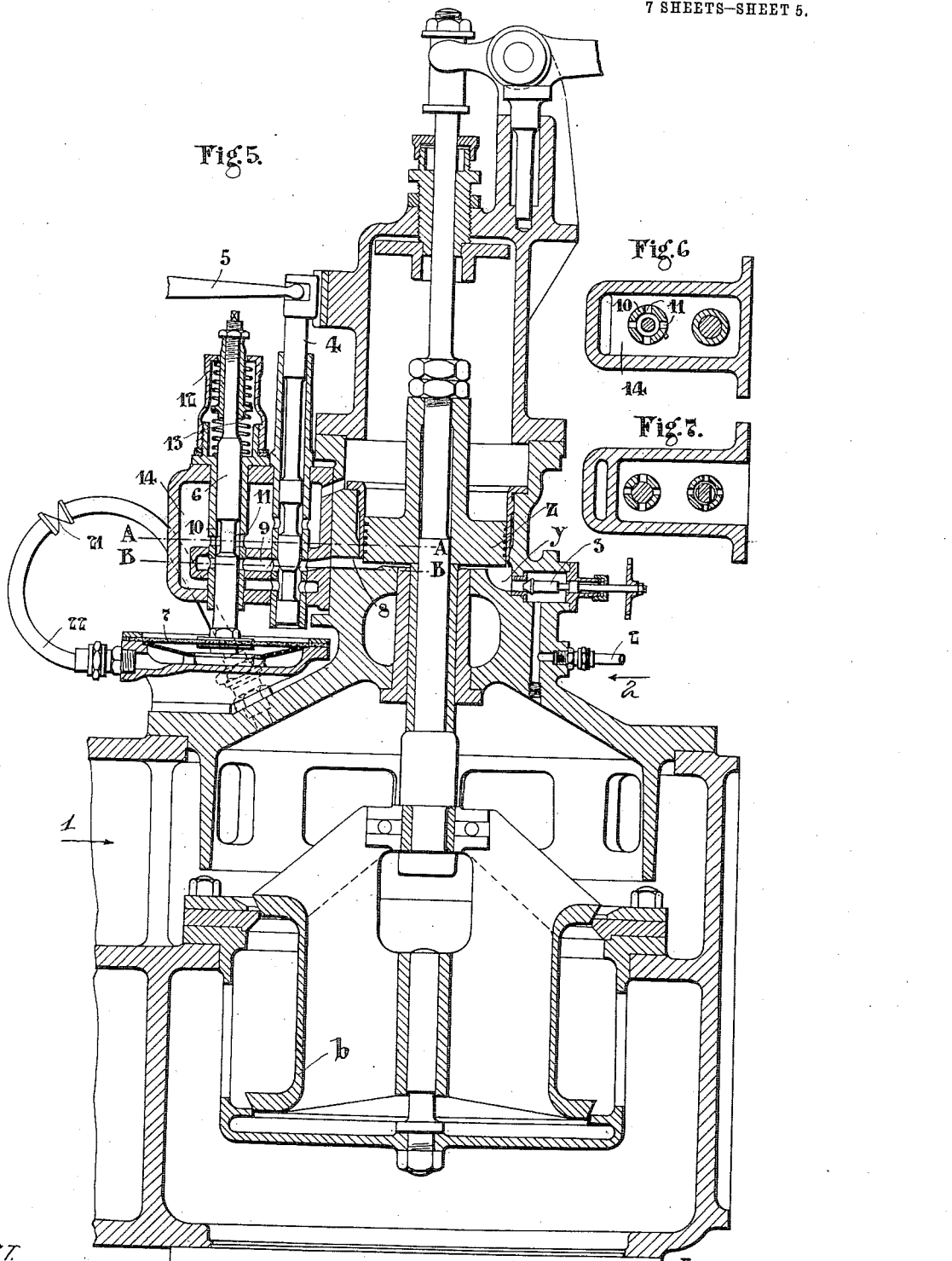

C. A. PARSONS, G. G. STONEY, A. Q. CARNEGIE & A. W. BOWERBANK.
CONTROLLING VALVE FOR FLUID OPERATED MOTORS.
APPLICATION FILED MAR. 6, 1909.

971,069.

Patented Sept. 27, 1910.

7 SHEETS—SHEET 6.

ATTEST.
Bent. M. Stahl.
Ewd. L. Folson.

INVENTORS.
CHARLES A. PARSONS.
GEORGE G. STONEY.
ALFRED Q. CARNEGIE
ALBERT W. BOWERBANK

BY Spear, Middleton, Donaldson & Spear
ATTYS.

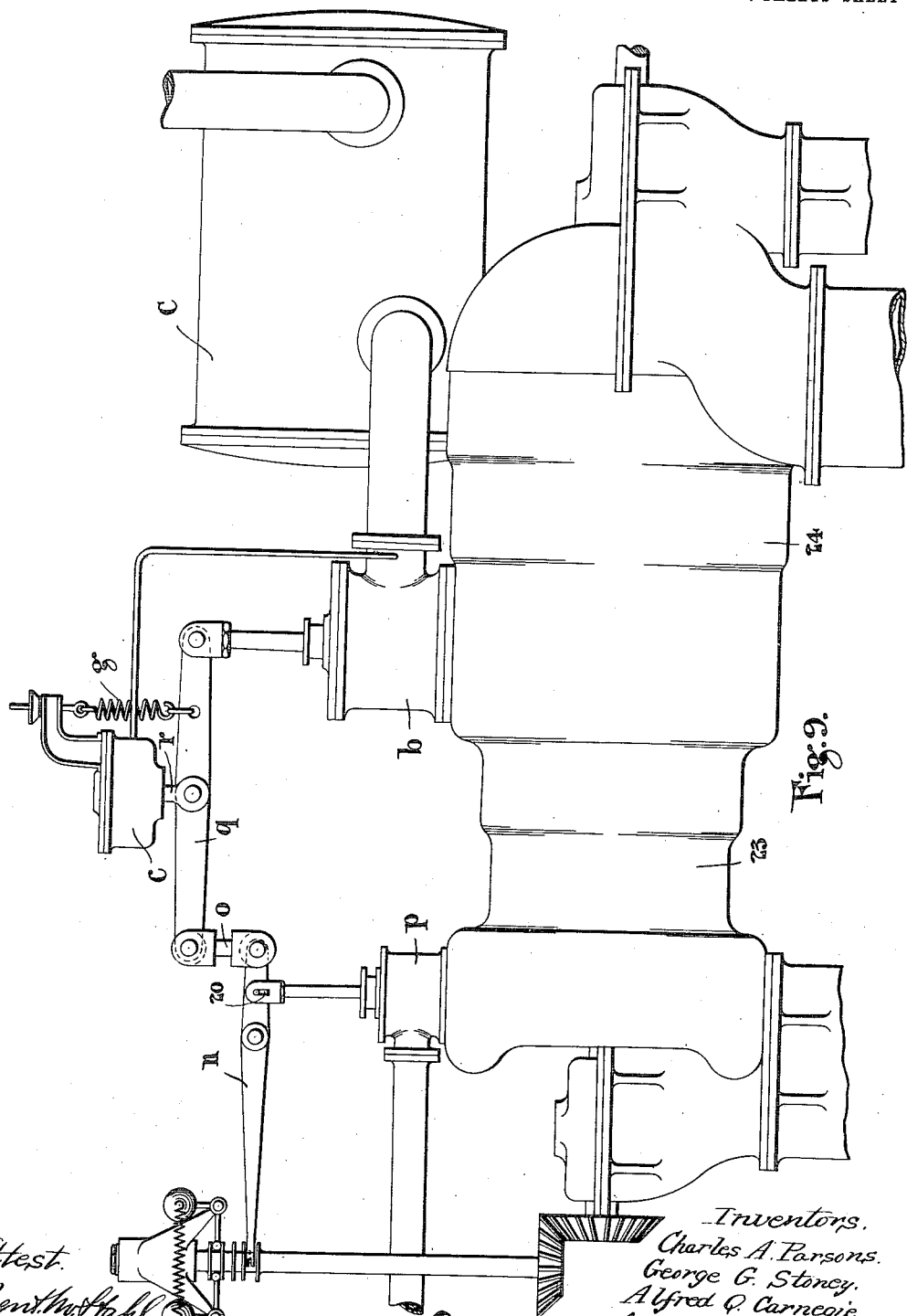

UNITED STATES PATENT OFFICE.

CHARLES ALGERNON PARSONS, GEORGE GERALD STONEY, ALFRED QUINTIN CARNEGIE, AND ALBERT WILLIAM BOWERBANK, OF NEWCASTLE-UPON-TYNE, ENGLAND; SAID STONEY, CARNEGIE, AND BOWERBANK ASSIGNORS TO SAID PARSONS.

CONTROLLING-VALVE FOR FLUID-OPERATED MOTORS.

971,069.

Specification of Letters Patent. Patented Sept. 27, 1910.

Application filed March 6, 1909. Serial No. 481,632.

*To all whom it may concern:*

Be it known that we, the Honorable CHARLES ALGERNON PARSONS, C. B., GEORGE GERALD STONEY, ALFRED QUINTIN CARNEGIE, and ALBERT WILLIAM BOWERBANK, all subjects of the King of Great Britain and Ireland, and residing at Heaton Works, Newcastle-upon-Tyne, in the county of Northumberland, England, have invented certain new and useful Improvements in Controlling-Valves for Fluid-Operated Motors, of which the following is a specification.

This invention relates to improvements in devices for controlling the working fluid of engines, turbines and the like.

In engines or turbines using exhaust or low pressure steam, gas or other elastic fluid as well as in combined engines or turbines using steam, gas or other elastic fluid at different pressures and from different sources, if the supply of exhaust or low pressure fluid falls off, or the supply of live fluid be insufficient, it has hitherto been possible, when the pressure of the working fluid in the engine or turbine becomes reduced, for a further reduction of pressure (which may in a condensing plant even approach the vacuum of the condenser) to occur in the receiver or accumulator or the like from which that engine or turbine receives its supply. This reduction of pressure or even a partial vacuum may occur at the exhaust of the motor (higher pressure turbine, reciprocating engine or the like) which delivers its exhaust to the low pressure engine or turbine. This possibility under certain circumstances may lead to variations in the speed of the high pressure part of the plant or may introduce other difficulties such as would hinder satisfactory operation and cause liability of air leakage with consequent reduction of vacuum in the condenser.

The object of the present invention is to provide an exhaust or low pressure elastic fluid plant of the character above indicated with improved means for preventing the pressure at the stop valve of, or at the delivery point of working fluid to the low pressure element from falling below a predetermined pressure while the plant is in operation.

The invention consists in a device automatically acting independently of the governor to close the low pressure delivery means and thus to prevent the pressure in said delivery means from falling below a predetermined value or, in mixed pressure plant, so acting in conjunction with the governor that only the low pressure fluid supply is at any time under the influence of said device.

The invention also consists in a controlling device for performing the function referred to in the preceding paragraph combined with a stop valve, governor controlled low pressure valve, trip gear, relay device or puff governing valve.

Figure 2:
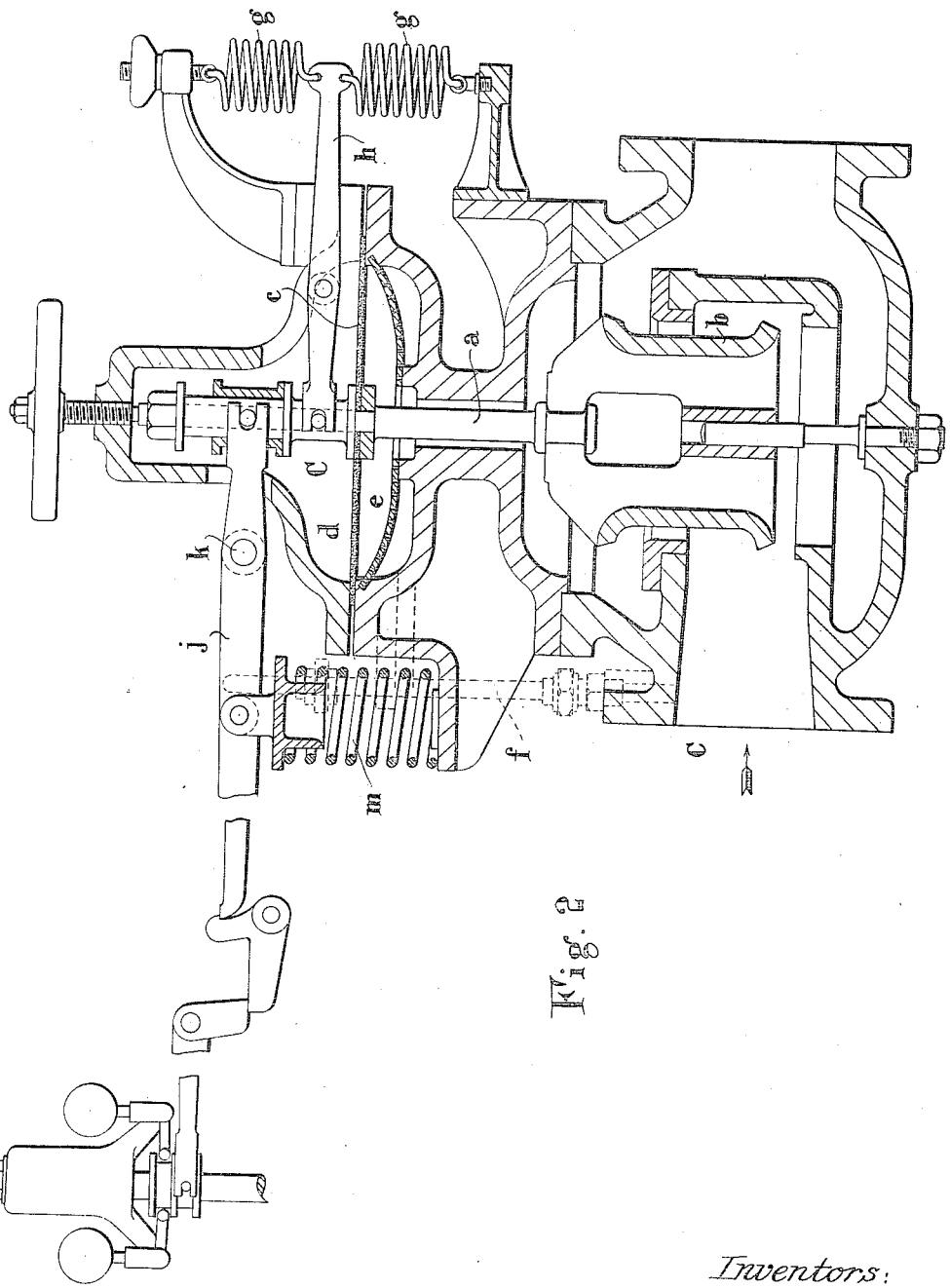
Figure 3:
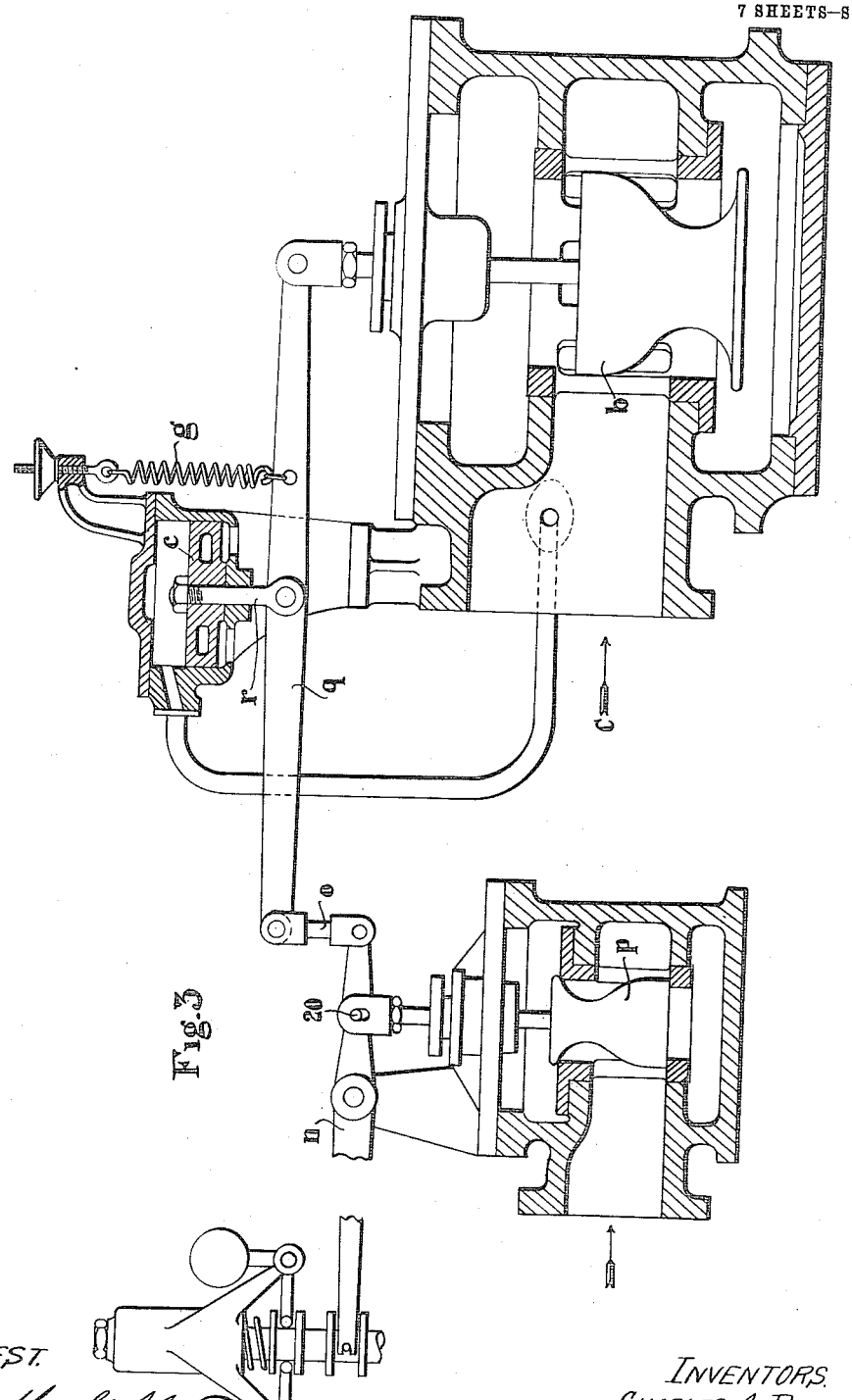
Figure 8:
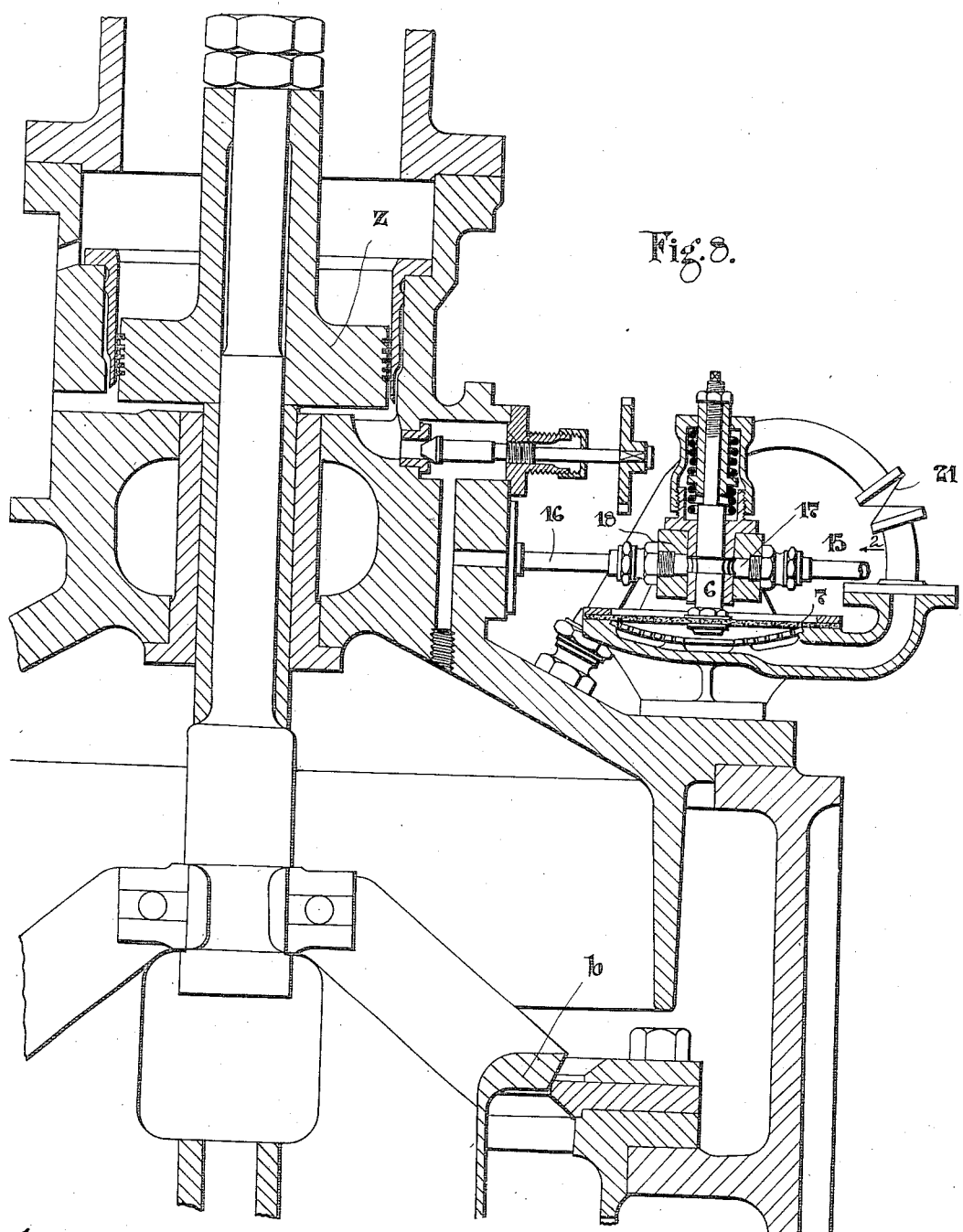

Referring now to the accompanying drawings: Figure 1 is a vertical section of a valve according to this invention provided with means for holding it to its seat when required. Fig. 2 is a vertical section of a valve similar to that shown in Fig. 1, but with a runaway controlling device attached to it. Fig. 3 is a vertical section of a modified form of the valve combined with a throttle valve operated directly by a governor. Fig. 4 is a vertical section of a modified arrangement of valve combined with a governor operated throttle valve. Fig. 5 is a vertical section of an arrangement in which a valve according to the invention is combined with and controlled by a steam relay device. Figs. 6 and 7 are cross sectional views on the lines A A and B B of Fig. 5. Fig. 8 is a vertical section representing a modified arrangement of combined relay controlling device and valve according to the invention, while Fig. 9 shows a general arrangement of the apparatus shown in Fig. 3 as applied to an installation comprising an accumulator and a combined high pressure and low pressure turbine.

The direction of the flow of the main fluid through the valves is indicated on the drawings by arrows numbered 1 and that of the relay fluid by arrows numbered 2.

In carrying this invention into effect there is provided in the supply pipe to the low pressure element a reducing valve which is so arranged that when the pressure at said low pressure element drops below a predetermined amount, it shall close or partly close and maintain atmospheric or some other predetermined pressure on the side of it which is toward the accumulator, receiver or exhaust of the higher pressure element which delivers steam or other elastic fluid to the low pressure element.

A convenient arrangement of steam reducing valve is shown in Fig. 1. The spindle, $a$, of the valve, $b$, is connected to a diaphragm, $c$, which divides a chamber into two parts, $d$ and $e$, of which the top chamber, $d$, is in communication with the atmosphere and the under chamber, $e$, communicates freely by a pipe, $f$, or the like with the steam on the receiver or accumulator side, C, of the reducing valve. Adjustable spring means, $g$, are provided which may act directly on the spindle or through a pivoted lever, $h$.

When a normal pressure above atmosphere is to be maintained at the accumulator side, C, of the valve, the springs, $g$, tend to press the valve toward its seat and so long as the pressure acting on the underside of the diaphragm exceeds an amount determined by the adjustment of the springs or the area of the diaphragm the valve remains open, but when the pressure falls below the normal the spring closes the valve more or less or entirely, thereby preventing any undue reduction of pressure on the supply side of the valve, no matter how low below the normal the pressure may be on the other side of the valve. It will be obvious of course that if at C a normal absolute pressure be required which is somewhat below atmospheric, the springs must tend to hold the valve normally opened against the difference of pressure acting upon the top of the diaphragm; when the pressure falls below the normal the valve will close or partially close against the resistance of the springs.

In many cases it is desirable to enable the valve to be used as a stop valve as well as to be influenced by the pressure controlling device, this being effected by providing a separate screwed spindle $i$, to hold the valve $b$, firmly on its seat when necessary.

It will be readily seen that the mechanical features of the device may be varied very considerably without departing from the invention; for example the diaphragm may be replaced by a piston working in a cylinder.

The reducing device may be arranged in conjunction with a runaway controlling device. One convenient way of effecting this is shown in Fig. 2 in which the construction of the reducing valve is substantially as described with reference to Fig. 1, a balanced valve, $b$, being connected with a diaphragm, $c$, or a piston. The valve may be spring loaded but normally held open against the spring by the pressure of the steam acting on the diaphragm. The initial tension of the springs, $g\ g$, determines the pressure at which the valve operates. On the under side of the diaphragm the low pressure steam acts but the other side is open to atmospheric pressure. If the pressure on the diaphragm falls, due to the partial vacuum or reduced pressure working backward, the valve will partially or entirely close. In engagement with the spindle there is also arranged one end of a lever, $j$, which is pivoted at $k$, the other end of the lever being normally held down against the resistance of a spring, $m$, by means of trip levers or the like under the control of a governor.

When the speed of the governor exceeds a predetermined amount, the trip mechanism is released and the spring, $m$, acting freely on the lever, thrusts the valve to its seat and prevents further passage of steam to the low pressure element. An auxiliary hand controlling element, $i$, may be also provided for closing the valve when required, as described with reference to Fig. 1.

It will be seen that in both Figs. 1 and 2, the device is not under the influence of the governor nor is the governor affected by it, but in the event of the speed of the motor becoming much too high the runaway governor (in Fig. 2) releases the trip mechanism which allows the spring, $m$, of the device to close the valve. In other cases the device may be combined with a higher pressure throttle valve worked direct from the governor, the arrangement being such that by means of a differential system of levers, the low pressure throttle valve may be closed independently of the controlling governor when the pressure of the exhaust steam falls to a predetermined limit. According to one method of carrying this into effect as shown in Figs. 3 and 9 throttle valves $p$ and $b$ admit the working fluid to the low pressure and high pressure turbine elements 23 and 24 respectively, the low pressure element 24 receiving its working fluid from an accumulator, C, into which the steam exhausted from an independent and intermittently working steam engine or the like is delivered. The governor which controls the speed of both elements 23 and 24 is connected to the high pressure valve, $p$, by a lever, $n$, which is connected by a link, $o$, to another lever, $q$, attached to the low pressure throttle valve, $b$. The lever, $q$, is pivotally attached to a member, $r$, carried by a piston $c$, or diaphragm or the like, to the top side of which steam from the receiver side, C, of the low pressure valve is admitted, the other side being open to atmosphere; a suitable spring adjustment, $g$, is provided to enable the pressure at which the valve will commence to close to be altered. In this arrangement the low pressure valve is opened before the high pressure valve is opened. If the governor comes into action the high pressure valve closes first and then the low pressure valve, certain idle movements 20, being provided for in the connection of the lever, $n$, with spindle of the high pressure valve, $p$, but, in all cases when the receiver pressure drops, the low pressure valve is closed, and it will be noted that on account of the idle movement above mentioned the closure of this low pressure valve is effected by the piston, $c$, entirely independently of the governor or other controlling element and without affecting the high pressure valve.

In a modification of the arrangement last described the lever, $q$, of the low pressure valve, $b$, (see Fig. 4) is connected to a link, $s$, which is pivoted to one end of a lever, $t$, with a fixed fulcrum at $u$, the other end of this lever, $t$, being connected to a spring pressed piston or diaphragm, $v$. On the underside of the piston, steam, oil or other fluid is admitted and this oil is prevented from escaping by means of a plunger valve, $w$, or like device operated by a diaphragm or piston, $x$, having exhaust steam on one side and atmospheric pressure on the other. The arrangement is such that if the exhaust pressure is not maintained at the turbine above a predetermined limit, the plunger, $w$, falls and allows the fluid under the piston, $v$, to escape and the spring moving the piston down, draws the low pressure throttle valve, $b$, into the closed position.

It will be noticed that in all these devices when combined with governor controlling means the action of the governor is first to open the low pressure valve until a point is reached where either the supply of exhaust steam is insufficient for the load or the pressure is not sufficient and then, when the low pressure valve is fully open, the governor begins to open the high pressure valve; but if the pressure in the receiver falls below the predetermined pressure the devices then close the low pressure valve so as to prevent the vacuum getting back into the receiver, but the governor or high pressure valve controlling element is not in any way affected.

In a further modification of the invention the low pressure throttle valve may be worked by a steam relay or by an oil or other suitable fluid-operated relay. Where a steam relay of the above character is used its exhaust chamber, 10, (Fig. 5) may be coupled to the condenser and the space, $y$, under the piston of it may be supplied with live or exhaust steam through a separate pipe, 2, and adjustable needle valve, 3, instead of by leakage through the gland as usually occurs. In Fig. 5 the reference 4 indicates the ordinary relay piston or plunger which is worked from the governor by the lever, 5. An auxiliary plunger or valve, 6, is at one end attached to a diaphragm, 7, or to a piston, the underside of which is connected by a pipe, 22, to the exhaust steam supply and the other side of which is exposed to the atmosphere. As will be seen from the figures the plungers and the passages controlled by them are so arranged that when the exhaust steam pressure falls too low the steam under the piston, $z$, of the relay is allowed to escape through the passages, 8 and 9, annular space, 10, and ports, 11, into the chamber, 14, which as above stated may be coupled to the condenser; the throttle valve, $b$, is thus partially closed so as to maintain the required pressure or it may be completely closed.

The pressure at which the valve or plunger, 6, will operate may be determined by adjusting springs, 12 and 13. In some cases or in each of the cases described hereinbefore a cock, 21, is placed in the pipe, 22, so that the resistance may be varied by throttling the bore more or less in order to prevent pulsation of the diaphragm. It will be observed that according to this arrangement as also according to Figs. 1 and 2, the low pressure valve closing device acts to prevent a drop of pressure entirely independently of the high pressure valve and governor.

In a modification of the device last described, in order to prevent the loss of steam through the underside of the relay piston which would occur when the throttle valve is closed, the plunger or valve, 6, may be made separate from the relay plunger but adapted to work in a similar manner to that described above. Such an arrangement is shown in Fig. 8, ports, 17 and 18, being provided in connection with the aforementioned plunger which may then cut off the supply of steam or other fluid to the relay cylinder when the throttle valve is closed. This device can be used either together with or independently of the relay plunger device described with reference to Figs. 5, 6 and 7, as obviously when the supply of steam to the under side of the relay piston falls the throttle valve will close.

In Fig. 8 the diaphragm, 7, is in its raised position the valve, 6, being open and the annular space establishing communication between the supply pipe, 15 and the pipe, 16, leading to the needle valve; but when the diaphragm deflects downward the plunger closes the supply pipe in consequence of which the piston and valve will fall, the latter being thereby closed upon its seat. In the case of a mixed flow turbine installed say at a colliery and having exhaust steam only when the winding plant is at work, it would mean a more or less serious loss to have steam flowing through the relay all night.

Although we have generally described the above invention in connection with a mixed flow turbine or one taking steam at two different pressures the same is applicable to any type of turbine taking steam at one pressure only when it is desired to prevent the pressure at the inlet of the turbine falling below a predetermined amount.

Having now described our invention what we claim as new and desire to secure by Letters Patent is:

1. In an elastic fluid operated plant having a high pressure and a low pressure element, fluid delivery means to said low pressure element, closing means within said delivery means, a device comprising an element responsive to changes of pressure within said low pressure delivery means, said device being connected to said closing means and operating the same without affecting the high pressure element to prevent a reduction in pressure below a predetermined amount from occurring within said low pressure delivery means.

2. In an elastic fluid operated plant having a high pressure and a low pressure element, fluid delivery means to each of said elements, closing means within each of said delivery means, a device comprising an element responsive to changes of pressure within said low pressure delivery means, said device being connected to operate only the low pressure closing means to prevent a reduction in pressure below a predetermined amount from occurring within said low pressure delivery means.

3. In combination in an elastic fluid operated plant having a low pressure element, fluid delivery means to said element, a relay controlled valve in said delivery means, a device subjected and responsive to changes of pressure in said delivery means, said device operating said valve independently of the relay device, whereby said low pressure valve is closed to prevent a reduction in pressure below a predetermined amount from occurring in said low pressure delivery means.

4. In combination in an elastic fluid operated plant having a high pressure and a low pressure element, fluid delivery means to each of said elements, a relay controlled valve in the low pressure delivery means, a device comprising a diaphragm subjected and responsive to changes of pressure within the low pressure delivery means, said device operating the low pressure valve independently of its relay device whereby only the low pressure valve is closed to prevent a reduction of pressure below a predetermined amount from occurring within said low pressure delivery means.

5. In combination in an elastic fluid operated plant having a low pressure element, fluid delivery means to said element, governing means to control the speed of said element, a relay controlled valve in said delivery means, a device subjected and responsive to changes of pressure in said delivery means, said device operating said valve independently of the relay device, whereby said low pressure valve is automatically closed independently of the governing means and without affecting the high pressure element to prevent a reduction in pressure below a predetermined amount from occurring within the low pressure delivery means.

6. In combination in an elastic fluid operated plant having a high pressure and a low pressure element, governing means controlling the speed of both of said elements, fluid delivery means to each of said elements, a relay controlled valve in the low pressure delivery means, a device comprising a diaphragm subjected and responsive to changes of pressure in said delivery means, said device operating said valve independently of the relay device whereby said low pressure valve is automatically closed independently of the governing means and without affecting the high pressure element to prevent a reduction in pressure below a predetermined amount from occurring within the low pressure delivery means.

7. In an elastic fluid operated plant having a high pressure and a low pressure element, fluid delivery means to said low pressure element, closing means within said delivery means, a device connected to said closing means comprising in combination an element responsive to changes of pressure in said delivery means, means connected with said closing means for governing the speed of said low pressure element, said device operating said closing means without affecting the high pressure element and independently of said governing means to prevent a reduction in pressure below a predetermined amount from occurring in said low pressure delivery means.

8. In an elastic fluid operated plant having a high pressure and a low pressure element, fluid delivery means to said low pressure element, closing means within said delivery means, a device connected to said closing means comprising in combination an element responsive to changes of pressure in said delivery means, means connected to said closing means for governing the speed of both of said elements, said device operating said closing means without affecting the high pressure element and independently of said governing means to prevent a reduction in pressure below a predetermined amount from occurring in said low pressure delivery means.

9. In an elastic fluid operated plant having a high pressure and a low pressure element, fluid delivery means to each of said elements, closing means within each of said delivery means, a device connected to the closing means in the low pressure delivery means comprising in combination an element responsive to changes of pressure within said low pressure element, means connected with said closing means for governing the speed of both of said elements, said device operating only the low pressure closing means independently of said governing means to prevent a reduction in pressure below a predetermined amount from occurring with said low pressure delivery means.

10. In combination in a fluid operated plant having a high pressure and a low pressure element, fluid delivery means to each of said elements, closing means within each of said delivery means, a device connected to the low pressure closing means comprising an element responsive to changes of pressure in said low pressure delivery means, means governing the speed of both of said elements, trip levers connecting said closing and governing means, whereby said device operates only the low pressure closing means independently of the governing means and without affecting the high pressure closing means to prevent a reduction in pressure below a predetermined amount from occurring within said low pressure delivery means and on the speed of said elements exceeding a predetermined value the governing means release said trip means and cause the low pressure delivery means to be closed.

11. In combination in a fluid operated plant having a high pressure and a low pressure element, fluid delivery means to said low pressure element, closing means within said delivery means, a device connected to said closing means comprising an element responsive to changes of pressure in said low pressure delivery means, means governing the speed of said low pressure element, trip levers connecting said governing means and low pressure closing means, said device operating the low pressure closing means without affecting the high pressure element and independently of said governing means to prevent a reduction of pressure below a predetermined amount from occurring within said low pressure delivery means.

12. In combination in a fluid operated plant having a high pressure and a low pressure element, separate valve and fluid delivery means thereto, a common governing means, a device acting automatically and independently of the governing means to close only the valve in the low pressure delivery means and prevent a reduction in pressure of the fluid in said low pressure delivery means without affecting the high pressure valve.

13. In combination in a fluid operated plant having a high pressure and a low pressure element, fluid delivery means to said low pressure element, a valve controlling the flow of fluid in said delivery means, speed governing means for said low pressure element, a device acting automatically and independently of the governing means to close the valve in said low pressure delivery means without affecting the high pressure element and prevent a reduction in pressure below a predetermined amount from occurring in said low pressure element.

14. In combination in a fluid operated plant having a high pressure and a low pressure element, fluid delivery means to said low pressure element, closing means within said delivery means, a device connected to said closing means comprising an element responsive to changes of pressure in said low pressure delivery means, means governing the speed of said low pressure element, trip levers connecting said governing means and low pressure closing means, said device operating the low pressure closing means without affecting the high pressure element and independently of said governing means to prevent a reduction of pressure below a predetermined amount from occurring within said low pressure delivery means and on a change of speed of said low pressure element said governing means acts independently of said device to close the low pressure valve.

15. In combination in an elastic fluid operated plant having a high pressure and a low pressure element, fluid delivery means to each of said elements, a valve in each of said delivery means, means controlling the speed of said elements and connected to each of said valves, a device comprising a diaphragm subjected and responsive to changes of fluid pressure in said low pressure delivery means, connections between said device and the low pressure valve, said device acting automatically and independently of said governing means to close said low pressure valve and prevent a reduction of pressure below a predetermined amount in the low pressure delivery means without affecting the high pressure valve.

16. In an elastic fluid operated plant having a high pressure and a low pressure element, fluid delivery means to each of said elements, a relay operated valve in the low pressure fluid delivery means, a valve in the high pressure delivery means, means governing the speed of said elements and connected to said valves, a device comprising a diaphragm subjected and responsive to changes of pressure in said low pressure delivery means, a plunger carried by said diaphragm and controlling the admission of fluid operating the low pressure relay controlled valve, whereby on a reduction of pressure in the low pressure delivery means said diaphragm operates said low pressure valve without affecting the high pressure valve.

17. Controlling means for plant using elastic working fluid and having a high pressure element and a low pressure element, comprising a low pressure throttle valve connected with a diaphragm on one side of which acts the fluid on the side of the valve toward which the fluid is moving, said diaphragm being adapted to operate only on the low pressure valve, a high pressure governor-controlled throttle valve, differential lever means connecting the two valves and the diaphragm, some idle movement being provided for in the connection of the differential lever means in order that the low pressure valve may be moved by the governor independently of the high pressure valve.

18. Controlling means for plant using elastic working fluid and having a high pressure element and a low pressure element, comprising a low pressure throttle valve and a high pressure throttle valve, a fluid operated spring pressed diaphragm a governor-controlled system of differential levers connecting the two valves and said diaphragm a second diaphragm subjected on one side to the fluid to the inlet side of the low pressure throttle valve and a plunger valve operated by the diaphragm and controlling the fluid on the diaphragm.

In testimony whereof, we affix our signatures in presence of two witnesses.

CHARLES ALGERNON PARSONS.
GEORGE GERALD STONEY.
ALFRED QUINTIN CARNEGIE.
ALBERT WILLIAM BOWERBANK.

Witnesses:
HENRY GRAHAM DAHYM, Jr.,
FREDERICK GORDON HAY BEDFORD.